(12) United States Patent
El-Hanany et al.

(10) Patent No.: US 7,528,377 B2
(45) Date of Patent: May 5, 2009

(54) RADIATION DETECTOR CIRCUIT

(75) Inventors: Uri El-Hanany, Rehovot (IL); Arie Shahar, Moshav Magshimim (IL)

(73) Assignee: Orbotech Medical Solutions Ltd., Rehovot (IL)

( * ) Notice: Subject to any disclaimer, the term of this patent is extended or adjusted under 35 U.S.C. 154(b) by 0 days.

(21) Appl. No.: 11/645,840

(22) Filed: Dec. 26, 2006

(65) Prior Publication Data

US 2008/0149842 A1 Jun. 26, 2008

(51) Int. Cl.
*H01L 27/146* (2006.01)
*G01T 1/00* (2006.01)

(52) U.S. Cl. .................... 250/370.09; 250/370.06; 250/370.01

(58) Field of Classification Search .......... None
See application file for complete search history.

(56) References Cited

U.S. PATENT DOCUMENTS

| | | | |
|---|---|---|---|
| 4,118,632 A | 10/1978 | Luig | |
| 4,446,570 A | 5/1984 | Guth | |
| 5,821,541 A * | 10/1998 | Tumer | 250/370.09 |
| 6,201,852 B1 | 3/2001 | Goddu et al. | |
| 6,353,227 B1 | 3/2002 | Boxen | |
| 6,590,215 B2 * | 7/2003 | Nygard et al. | 250/370.09 |
| 6,621,084 B1 * | 9/2003 | Wainer et al. | 250/370.09 |
| 6,732,059 B2 * | 5/2004 | Warburton et al. | 702/78 |
| 6,762,413 B2 | 7/2004 | Zeng | |
| 7,078,669 B2 | 7/2006 | Mikkelsen et al. | |
| 7,274,022 B2 | 9/2007 | Soluri et al. | |
| 2003/0010924 A1 * | 1/2003 | El-Hanany et al. | 250/370.09 |
| 2004/0200965 A1 | 10/2004 | Umegaki et al. | |
| 2004/0239377 A1 * | 12/2004 | Tumer et al. | 327/94 |
| 2006/0131508 A1 * | 6/2006 | Burr et al. | 250/370.11 |
| 2007/0007454 A1 | 1/2007 | Stoddart et al. | |
| 2007/0221853 A1 | 9/2007 | Joung | |
| 2007/0235657 A1 * | 10/2007 | He et al. | 250/389 |
| 2007/0248265 A1 | 10/2007 | Lundstrom et al. | |
| 2007/0295914 A1 * | 12/2007 | El-Hanany et al. | 250/371 |
| 2008/0073540 A1 | 3/2008 | Vija | |

OTHER PUBLICATIONS

J.D. Eskin, et al., "Signals induced in semiconductor gamma-ray imaging detectors", published in the Journal of Applied Physics, vol. 85, pp. 647ff. 1999.

* cited by examiner

*Primary Examiner*—David P Porta
*Assistant Examiner*—Yara B Green
(74) *Attorney, Agent, or Firm*—Ladas and Parry LLP

(57) ABSTRACT

Apparatus for detecting radiation, including a detector which is configured to generate electrical charges responsive to incidence of a photon on the detector. The apparatus includes a plurality of detector circuits coupled to the detector at different respective locations. Each detector circuit consists of an amplifier which is configured to generate a pulse in response to the charges, and a first pulse shaper, having a first time constant, which is configured to produce a metric representative of an energy of the pulse. Each detector circuit also has a second pulse shaper, having a second time constant greater than the first time constant, which is configured to produce an indication that the metric is representative of an energy of the photon. The apparatus also includes a summing device which is coupled to sum the metric of each of the detector circuits in response to the respective indication.

19 Claims, 3 Drawing Sheets

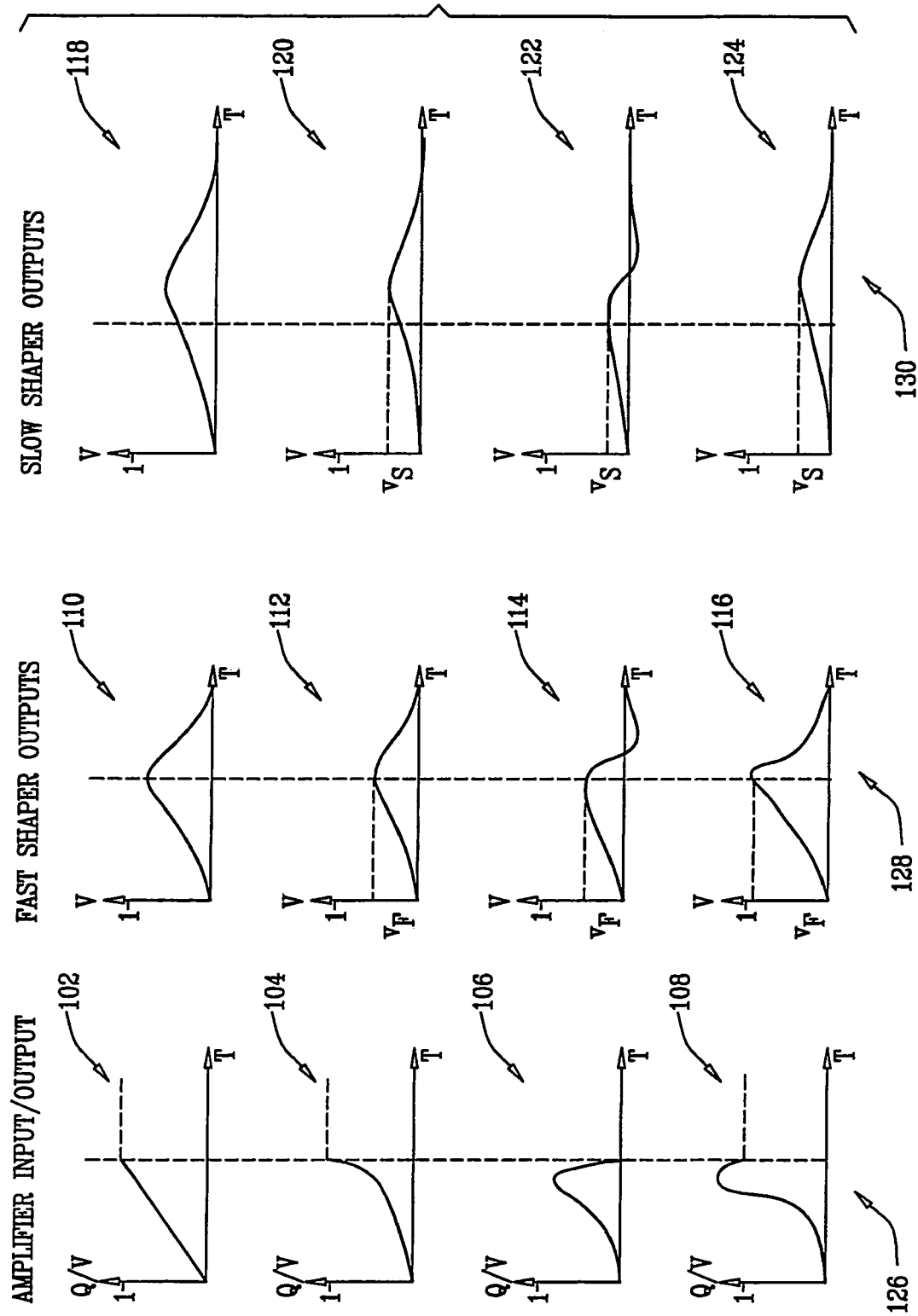

RADIATION DETECTOR CIRCUIT

FIELD OF THE INVENTION

Embodiments of the present invention relate generally to photon detection, and specifically to photon detection in a pixellated detector array.

BACKGROUND OF THE INVENTION

Photon imaging detectors using semiconductors are known in the art. Typically, the semiconductor is in the form of a sheet, and electrodes are formed on either side of the sheet. X-ray or γ-ray photons that interact with the semiconductor generate electron-hole pairs, and the pairs are detected as charges at the electrodes. One semiconductor which has been successfully used as an imaging detector is cadmium zinc telluride (CZT).

A document, "Signals induced in semiconductor gamma-ray imaging detectors" by J. D. Eskin et al., published in the Journal of Applied Physics, Vol. 85, pp. 647ff. (1999), is incorporated herein by reference. The document describes the signals generated in a semiconductor sheet, typically CZT, when the electrodes formed on the semiconductor are in the form of pixels.

U.S. Pat. No. 7,078,669 to Mikkelsen et al., whose disclosure is incorporated herein by reference, describes a readout circuit for reading active pixels in a sensor. The sensor uses a fast shaper and a slow shaper connected to each pixel. The fast shaper is used to establish an incident time of radiation striking the pixel. The slow shaper is used for determining the peak energy value of the pixel if it goes active.

However, notwithstanding existing systems, an improved method for reading imaging detectors would be advantageous.

SUMMARY OF THE INVENTION

In an embodiment of the present invention, a photon detector system comprises a semiconductor connected to an array of electrodes. Each electrode is coupled to a detector circuit. Each detector circuit comprises an amplifier, typically a charge sensitive amplifier, which generates a pulse in response to an interaction of a photon with the semiconductor. The pulse from each amplifier is conveyed to a first pulse shaper and, in parallel, to a second pulse shaper. The first pulse shaper produces a first metric which corresponds to the pulse energy. The second pulse shaper, which has a time constant greater than that of the first pulse shaper, produces a second metric which, because of the greater time constant of the second shaper, functions as an indication that the first metric is representative of an energy of the photon. The second metric is used to generate a triggering signal for a summing device. The triggering signal allows the summing device to select which of the first metrics are to be considered as including true events, i.e., events which contribute to generating an energy measurement for the photon, or as false events, i.e., events which do not contribute to generating an energy measurement for the photon.

The summing device is configured to sum all first metric values which have the triggering signal greater than a preset value. The summed output provides a good measure of the energy of the photon, since the summing device only adds energies generated at the electrodes by true events.

Typically, the triggering signal is formed by finding a ratio relating the first and second metrics. The triggering signal may also be configured for use as a coincidence detector, to ensure that the summing device only sums energies from pulses occurring within a given timing window.

There is therefore provided, according to an embodiment of the present invention, apparatus for detecting radiation, including:

a detector which is configured to generate electrical charges responsive to incidence of a photon thereon;

a plurality of detector circuits coupled to the detector at different respective locations, each circuit including:

an amplifier which is configured to generate a pulse in response to the charges;

a first pulse shaper, having a first time constant, which is configured to produce a metric representative of an energy of the pulse;

a second pulse shaper, having a second time constant greater than the first time constant, which is configured to produce an indication that the metric is representative of an energy of the photon; and a summing device which is coupled to sum the metric of each of the detector circuits in response to the respective indication.

Typically the detector includes a semiconducting sheet having a plurality of electrodes at the respective locations, and the electrodes are configured as anodes that are coupled to the respective amplifiers. The anodes may be arranged to perform at least partial collection of the electrical charges, and the metric may be computed in response to the at least partial collection.

In an embodiment the first pulse shaper is coupled to receive the pulse, and the metric includes a first-shaper-peak-level of an output of the first pulse shaper generated in response to the pulse.

In some embodiments the second pulse shaper is coupled to receive the pulse, and the indication includes a second-shaper-peak-level of an output of the second pulse shaper generated in response to the pulse. The apparatus typically includes comparator circuitry which is configured to receive the second-shaper-peak-level and in response to output a Boolean value that the metric is representative of the energy of the photon. The comparator circuitry may be configured to receive the metric, to form a ratio relating the second-shaper-peak-level and the metric, and to compare the ratio with a preset level so as to output the Boolean value. Typically, the metric includes a first-shaper-peak-level of an output of the first pulse shaper generated in response to the pulse. The apparatus may also include a coincidence verifier circuit which is coupled to receive the Boolean value of each of the detector circuits, and in response to provide a trigger that operates the summing device.

In a disclosed embodiment the apparatus includes a processor which is coupled to receive the metric of each of the detector circuits in response to the respective indication, and which is configured, in response, to compute an interaction-location of the photon within the detector. Typically, for each of the detector circuits, the processor is configured to apply a weight to the metric according to a value of the metric, and to apply the weight in computing the interaction-location.

In one embodiment each detector circuit includes comparator circuitry which is configured to generate a ratio relating the metric to the indication, and to generate a summing trigger in response to the ratio, and wherein the apparatus further includes a coincidence verifier circuit which receives each summing trigger and in response provides a coincidence signal, representative of coincidence between each pulse, to the summing device, so as to cause the device to sum.

There is further provided, according to an embodiment of the present invention, a method for detecting radiation, including:

generating in a detector electrical charges responsive to incidence of a photon thereon;

coupling a plurality of detector circuits to the detector at different respective locations, each circuit consisting of:

an amplifier which is configured to generate a pulse in response to the charges;

a first pulse shaper, having a first time constant, which is configured to produce a metric representative of an energy of the pulse;

a second pulse shaper, having a second time constant greater than the first time constant, which is configured to produce an indication that the metric is representative of an energy of the photon; and summing in a summing device the metric of each of the detector circuits in response to the respective indication.

The present invention will be more fully understood from the following detailed description of the embodiments thereof, taken together with the drawings, a brief description of which follows.

BRIEF DESCRIPTION OF THE DRAWINGS

FIG. 4 shows schematic graphs for a cathode and the anodes of the photon detector of FIG. 1, according to an embodiment of the present invention.

DETAILED DESCRIPTION OF EMBODIMENTS

Figure 1:
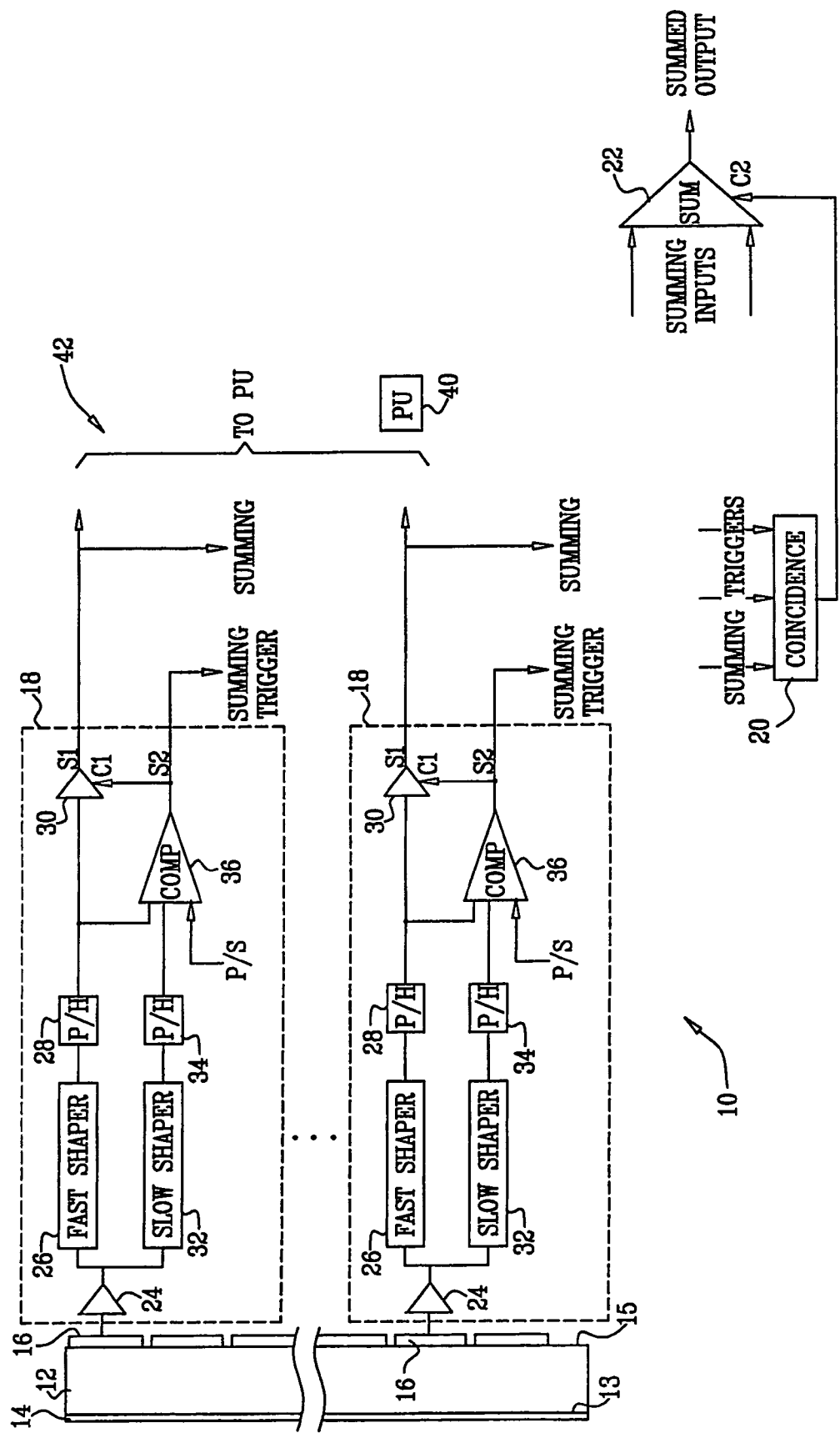
FIG. 1 is a schematic diagram of a photon detector, according to an embodiment of the present invention.

Reference is now made to FIG. 1, which is a schematic diagram of a photon detector 10, according to an embodiment of the present invention. Detector 10 may be used to measure the energy of an incident photon as it interacts with a semiconductor 12. The detector may also be used to measure the position of the photon within semiconductor 12 at the time of the interaction. The interaction consists of absorption of the photon, and resulting generation of an energetic electron-hole pair. The energetic pair generates a multiplicity of lower energy electron-hole pairs. In some cases the photon undergoes Compton scattering before absorption, each scattering event generating a respective energetic electron-hole pair, each energetic electron-hole pair generating a respective multiplicity of lower energy electron-hole pairs. As described below, from signals generated in detector 10 by the lower energy electron-hole pairs, the detector generates an energy of the incoming photon, and a position of the absorption within semiconductor 12.

Semiconductor 12 typically comprises cadmium zinc telluride (CZT). However, embodiments of the present invention are not limited to any specific type of semiconductor for the material comprising semiconductor 12. For example, semiconductor 12 may be formed from silicon and/or germanium.

By way of example, in the following description a separate processing unit (PU) 40 is assumed to operate detector 10. However, it will be understood that detector 10 may operate without such a separate processing unit. For example, functions performed by PU 40 may also be performed by configuring detector 10 as an application specific integrated circuit (ASIC), with appropriate circuitry. Alternatively or additionally, a field programmable gate array (FPGA) may be configured to perform at least some of the functions performed by PU 40.

Semiconductor 12 is formed as a two-sided sheet having one or more electrodes 14 on a first face 13 of the sheet, and a pixellated array of electrodes 16, all of which are typically substantially similar, on a second face 15 of the sheet. The array of electrodes 16 is typically formed as a two-dimensional array having rectangular or hexagonal symmetry. However, embodiments of the present invention are not limited to any particular type of array, and electrodes 16 may be configured as any convenient one- or two-dimensional array. By way of example, electrode 14 is hereinbelow assumed to be one electrode. Electrodes 14 and 16 are coupled so that PU 40 maintains a potential difference between the two types of electrodes, so that electrode 14 acts as a cathode, and electrodes 16 act as anodes. Electrodes 14 and 16 are herein also referred to respectively as cathode 14 and as anodes 16.

Each anode 16 is coupled to a respective detector circuit 18, and each detector circuit 18 provides a respective output signal to a coincidence verifier circuit 20, and to a summing device 22. Each anode 16 is assigned a unique address which PU 40 uses to determine corresponding locations of the anodes. For clarity, in FIG. 1 only two detector circuits 18 are shown.

Each circuit 18 comprises a charge sensitive amplifier (CSA) 24, which receives its charge input pulse directly from its respective anode 16. The output of CSA 24 is a voltage signal proportional to the charge input, and the CSA output is coupled to a fast shaper 26. Fast shaper 26 is followed by a peak and hold (P/H) circuit 28, which outputs the maximum level reached by shaper 26.

The output of CSA 24 is also used as an input to a slow shaper 32, the maximum level of which is output by a P/H circuit 34. In some embodiments, track and hold circuits may be used instead of the peak and hold circuits. Each shaper acts to alter the shape of the signal generated by CSA 24. As described in more detail below, in embodiments of the present invention the fast shaper may be used to determine an energy of the incident photon, and the slow shaper provides a triggering signal that is used to determine if a summing condition is met by the output of the fast shaper.

Figure 2:
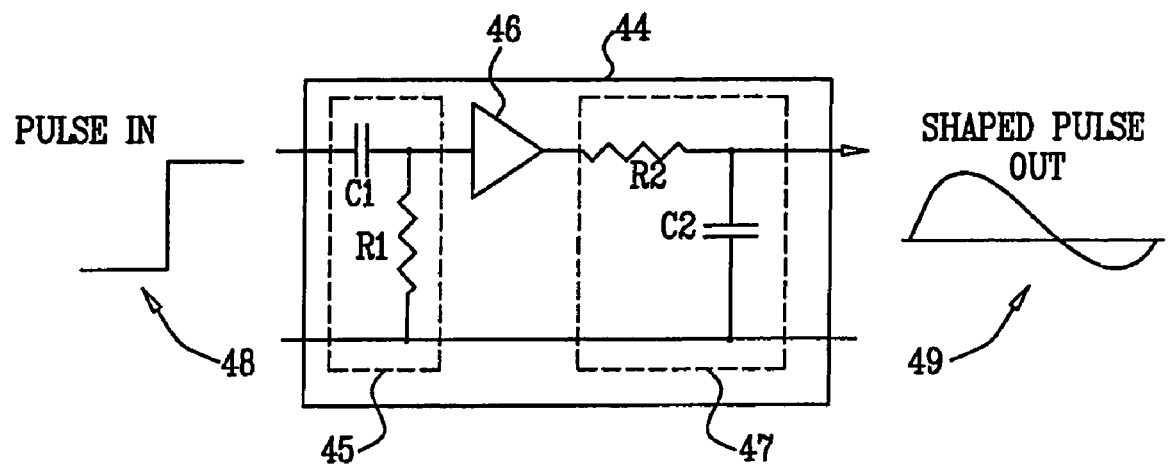
FIG. 2 is a schematic simplified electronic circuit of a generic pulse shaper, according to an embodiment of the present invention.

FIG. 2 is a schematic simplified electronic circuit of a generic pulse shaper 44, according to an embodiment of the present invention. Pulse shapers 26 and 32 operate according to principles similar to those of generic shaper 44. Shaper 44 comprises an input filter 45, which is configured as a high-pass filter that feeds to an amplifier 46. By way of example, filter 45 is assumed herein to be a CR high-pass filter. The signal from the amplifier is filtered in an output filter 47, which is configured as a low-pass filter. By way of example, filter 47 is assumed herein to be an RC low-pass filter. If, for example, a step function 48 is input to pulse shaper 44, the shaper generates a shaped pulse 49 as its output. The characteristics of shaped pulse 49 depend on the properties of the input and output filters of the shaper. Typically, the input and output filter have characteristic time constants which are set to be approximately equal. In embodiments of the present invention, slow shaper 32 has longer time constants than the time constants of the fast shaper 26.

In an embodiment, the high pass and low pass time constants of fast shaper 26 are adjusted to produce a highest signal-to-noise ratio (SNR). Typically, the high pass and low pass time constants of slow shaper 32 are adjusted to produce a small signal for false events, and a high signal for true events. False and true events are described below with reference to FIG. 3. The signal levels output by the slow shaper are described in more detail with reference to FIG. 4.

Returning to FIG. 1, for each circuit 18 the output of P/H circuit 34 is a first input to Boolean comparator circuitry 36. Comparator circuitry 36 also receives as a second input the output of P/H circuit 28. Comparator circuitry 36 finds a ratio generated by the two outputs, and compares the ratio to a preset level (P/S), provided by PU 40. Typically, the ratio formed by the comparator circuitry is a direct ratio, of the form $$\frac{A}{B},$$

where A is the first input and B is the second input. Alternatively, the ratio may be a function of A and B, such as $$\frac{A^n}{B^n}, n \in R,$$

$$\frac{\log A}{\log B}, \text{ or } \frac{e^A}{e^B}.$$

If the value of the ratio is greater than or equal to the preset level, comparator circuitry 36 outputs a Boolean true level. If the ratio is less than the preset level, comparator circuitry 36 outputs a Boolean false level.

Comparator circuitry 36 is configured to compare the ratio of the two inputs from a given anode 16 with a preset level, rather than comparing one of the inputs with the preset level. A ratio is used since the value generated at each input is dependent on the number of electrons incident on the given anode, so that, by using the ratio, embodiments of the present invention are able to successfully distinguish between true, false and a mixture of true and false events.

Both true and false levels output by comparator circuitry 36 are configured to be pulses having an operative time $\Delta T_1$. As described below, inter alia, the pulses output from circuitries 36 are typically used to determine if the outputs generated at the different anodes 16 are coincident.

For each circuit 18, the output of P/H circuit 28 is input to a gate 30. Gate 30 has a control input C1, so that when C1 is at a true level, the gate conducts. When C1 is at a false level, gate 30 does not conduct. Thus, gate 30 acts as switch which is closed or open according to the state of the control input. The output of comparator circuitry 36 is coupled to control input C1 so that, for each circuit 18, the output of gate 30 is switched by the level output by the circuit's comparator circuitry. The output of gate 30 is a function of the level output by CSA 24, and is a non-Boolean level.

Each circuit 18 has two outputs. A first output S1 is the non-Boolean level output from gate 30, a second output S2 is the Boolean level output by comparator circuitry 36. All the first outputs S1 of circuits 18 are coupled as inputs to summing device 22. Device 22 also has a Boolean control input C2. When control C2 is true, device 22 sums the values of its inputs. If C2 is false, the device does not sum its inputs. In addition, first outputs S1 are also coupled to PU 40, via lines 42. PU 40 uses the outputs on lines 42 to determine which anodes 16 are providing signals to device 22. These anodes 16 are herein termed active anodes. As described below, PU 40 uses the positions of active anodes 16 to determine a location of the interacting photon.

Control C2 is activated by coincidence verifier circuit 20. Verifier circuit 20 receives as inputs the Boolean output pulses of all circuitries 36. Circuit 20 is configured so that if any one or more inputs are true for at least a time $\Delta T_2$, where $\Delta T_2 < \Delta T_1$, control C2 sets to true. Otherwise control C2 sets to false. $\Delta T_2$ is an overlap time which defines coincidence of pulses. Both $\Delta T_1$ and $\Delta T_2$ are set by an operator of detector 10, based on the following considerations:

In cases that events occurring at different pixels are the result of Compton scattering, the coincidence time depends on the parameters of semiconductor 12, such as its thickness, and the aspect ratio between the anode size and the thickness. The coincidence time also depends on the product $\mu\tau$ where $\mu$ is the mobility of the charge carriers, in this example electrons, and $\tau$ is the life-time of the charge carriers.

In cases of charge sharing, the coincidence time depends on the location where the photon is absorbed in the region between adjacent pixels.

Using these considerations, those having ordinary skill in the art will be able to set appropriate values of $\Delta T_1$ and $\Delta T_2$ without undue experimentation.

Thus, verifier circuit 20 and summing device 22 operate to provide a summed output, at the output of the device, of coincident signals generated by active anodes 16.

The summed output from device 22 is a measure of the energy of the photon that generated the inputs to the device. A measure of the location of the photon within semiconductor 12 as it interacts with the semiconductor is provided by the positions of the active anodes that provide input to device 22. PU 40 registers the positions of the active nodes using lines 42 from the anodes, the processing unit correlating the outputs of the active anodes with the addresses of the anodes, and thus the locations of the active anodes. Typically, in the case that more than one anode provides inputs to summing device 22, PU 40 determines a location for the photon interaction as an average of the locations of the active anodes. Typically, the average is weighted according to the levels output by gates 30.

Figure 3:
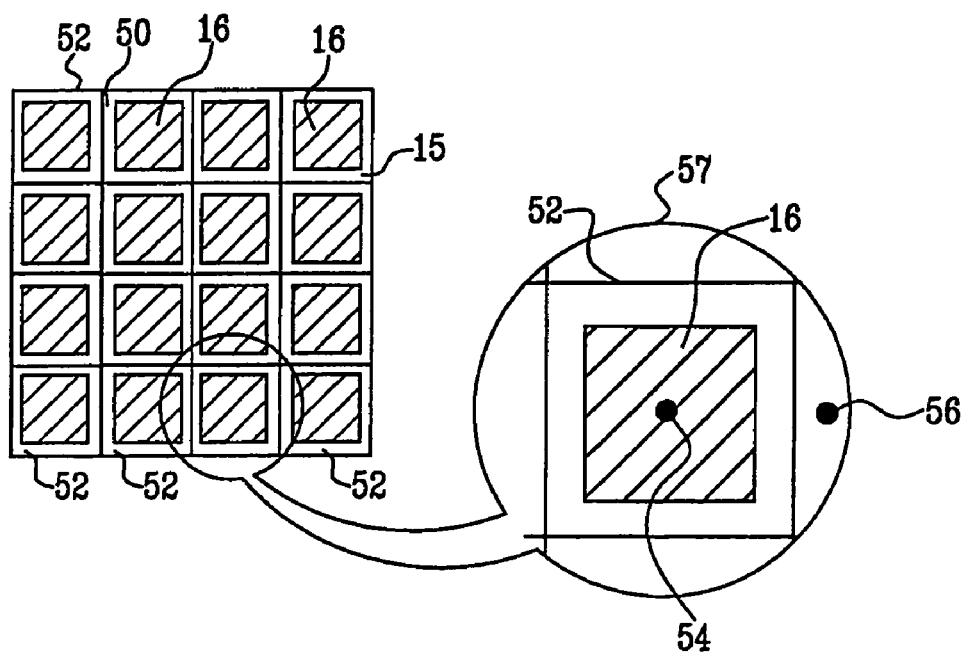
FIG. 3 is a schematic diagram of anodes of the photon detector of FIG. 1, according to an embodiment of the present invention.

FIG. 3 is a schematic diagram of anodes 16 on face 15, according to an embodiment of the present invention. By way of example, anodes 16 are herein assumed to be substantially square, and to be arranged in a rectangular array, separated by substantially insulating spaces 50 between the anodes. The anode and the space between the anodes define pixels 52 of semiconductor 12. An enlargement 57 of one of pixels 52 is also shown in FIG. 3. A point 54 is located on anode 16, and a point 56 is located on space 50, i.e., face 15, between the anodes. Points 54 and 56 are referred to below in reference to FIG. 4.

FIG. 4 shows schematic graphs for cathode 14 and a given anode 16, according to an embodiment of the present invention. The graphs show charges (Q) and voltages (V) vs. time after a photon is incident on, and interacts with, semiconductor 12. Although, as described above, the photon interaction leads to a multiplicity of electron-hole pairs being formed, the graphs of FIG. 4 have been normalized assuming that a pair of arbitrary unit positive and negative charges is produced. The graphs show the effects of the induced charge produced by the negative unit charge, comprised of the electrons of the pair. The effect of the holes may be ignored due to, inter alia, the following reasons:

The aspect ratio between the size of anodes 16 and the thickness of semiconductor 12 produces a significant "small pixel effect" which makes the detector substantially only sensitive to electrons. The small pixel effect is described in the article by Eskin et al. referenced in the Background of the Invention.

The holes have a very low mobility in comparison to the electron mobility. Thus most of the holes are trapped and recombine within detector 12 without contributing significantly to the induced charge.

Those holes which are not trapped and which do not recombine move so slowly that the rise time of the induced charge that they produce is much slower than the time constants of shapers 26 and 32. Thus, the hole contribution to the signals generated by the shapers is negligible.

Column 126 shows charges (Q) input to CSA 24, and voltages (V) output by the amplifier. Graph 102 shows the induced charge vs. time that is produced at cathode 14. Graph 102 also corresponds to the output vs. time of a charge sensitive amplifier, if such an amplifier is connected to cathode 14. Graph 102 shows that the induced charge on the cathode increases substantially linearly as the unit charge moves towards anodes 16. The charge on the cathode levels off at the value of the unit charge when the unit charge reaches anodes 16.

Graphs 104, 106, and 108 show induced charge vs. time produced at a given anode 16, for different positions of the unit charge relative to the given anode. Graphs 104, 106 and 108 also correspond to the output voltage vs. time of the CSA 24 of the given anode.

Graph 104 shows the change in induced charge on the given anode 16, assuming that the unit charge eventually reaches a point on the anode itself, such as point 54 (FIG. 3), so that substantially all the charge is collected by the given anode. The difference in shape between graph 104 and graph 102 is due to the small pixel effect. The charge on the anode levels off at the value of the unit charge when the latter reaches the anode.

Graphs 106 shows the change in induced charge on the given anode 16, assuming that the unit charge eventually reaches a point outside the anode itself, such as point 56 (FIG. 3). In this case there is substantially no charge collection by the given anode. The initial rise in the graph occurs because the moving unit charge induces a charge on the anode, in a process that is generally similar to that shown in the initial part of graph 104. However, because the unit charge does not reach a point on the anode, the induced charge on the anode reduces to zero as the unit charge reaches point 56 in region 50.

Graph 106 shows that a false signal is generated by the induced charge only, wherein there is no charge collection at the given, non-collecting, anode. In this case, the process starts with induced charge at the non-collecting anode that rises up and later falls down to be equal to zero. The temporal behavior of the induced charge of the false signal corresponding to a non-collecting anode has a maximum before it falls down to zero. As shown in graphs 114 and 122, described in more detail below, this peak is held by P/H circuits 28 and 34 (or by the equivalent track and hold circuits) that register the peak value and hold it before the induced charge starts to fall down. Thus P/H circuit 28 (from the fast shaper) produces a false signal in spite of the fact that at the end of the process the total induced charge is zero, corresponding to a false event. As explained below, embodiments of the present invention detect the presence of false events, and do not use signals generated by the false events to compute the energy of the photon that generates the charges.

Graph 108 shows the change in induced charge on a given anode when a combination of the events described for graphs 104 and 106 occurs. Graph 108 corresponds to a charge sharing process wherein one unit charge eventually reaches a given anode, and a second unit charge reaches a point outside the given anode. In this case there is a partial charge collection by the given anode.

Embodiments of the present invention use the signals developed on fast shaper 26 and slow shaper 32 to allow detector 10 to register signals such as those of graphs 104 and 108 as true events, and to register signals such as those of graph 106 as a false event. The signals on the fast shaper (corresponding to graphs 102, 104, 106, and 108) are shown in respective graphs 110, 112, 114, and 116 in column 128. Respective graphs 118, 120, 122, and 124 in column 130 show the signals on the slow shaper. Inspection of the graphs shows that, due to the difference in time constants of the two shapers, the signals generated by the fast shaper rise and fall faster than those of the slow shaper. In addition, the peak value, $V_s$, reached by the slow shaper is less than the peak value, $V_f$, reached by the fast shaper.

The inventors have found that the peak level output from the slow shaper, $V_s$, provides a good measure of whether the event being detected is, on the one hand only a false event, or, on the other hand a true event or a combination of a true event with a false event. By finding the ratio of the slow shaper output to the fast shaper output, as explained above with reference to FIG. 2, the effective slow shaper output may be made substantially independent of the actual charge developed on any given anode 16.

As stated above, graphs 120, 122, and 124 have been normalized. It will be appreciated that because of the normalization, the values of $V_s$ correspond to the ratios referred to above. The values of $V_s$ for graphs 120 and 124, corresponding to events that incorporate true events, are approximately the same, and are herein referred to as the true-event-$V_s$. It will be understood that graphs 120 and 124 occur respectively for true and true with false events, when there is high or partial charge collection. The inventors have found that the value of true-event-$V_s$ is significantly higher than the value of $V_s$ for graph 122, corresponding to false events, wherein there is substantially no charge collection at a given anode, herein referred to as false-event-$V_s$. Thus, by setting the preset level for comparator circuitry 36 to be between the true-event-$V_s$ value and the false-event-$V_s$ value, comparator circuitry 36 is able to differentiate between events which include a true event and events which are only false.

Returning to FIG. 1, detector 10 may be operated using a preset level for comparator circuitry 20 between the true-event-$V_s$ value and the false-event-$V_s$ value. In this case, the only outputs that device 22 sums are those generated by anodes 16, each of the anodes having either a true event, or a combination of a true and false event. The summed output thus gives a good estimate of the energy of the incident photon generating the events.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. Apparatus for detecting radiation, comprising:
   a detector which is configured to generate electrical charges responsive to incidence of a photon thereon;

a plurality of detector circuits coupled to the detector at different respective locations, each circuit comprising:
an amplifier which is configured to generate a pulse in response to the charges;
a first pulse shaper, having a first time constant, which is configured to produce a metric representative of an energy of the pulse;
a second pulse shaper, having a second time constant greater than the first time constant, which is configured to produce an indication that the metric is representative of an energy of the photon; and
a summing device which is coupled to sum the metric of each of the detector circuits in response to the respective indication,
wherein each detector circuit comprises comparator circuitry which is configured to generate a ratio relating the metric to the indication, and to generate a summing trigger in response to the ratio, and wherein the apparatus further comprises a coincidence verifier circuit which receives each summing trigger and in response provides a coincidence signal, representative of coincidence between each pulse, to the summing device, so as to cause the device to sum.

2. The apparatus according to claim 1, wherein the detector comprises a semiconducting sheet having a plurality of electrodes at the respective locations, and wherein the electrodes are configured as anodes that are coupled to the respective amplifiers.

3. The apparatus according to claim 2, wherein the anodes are arranged to perform at least partial collection of the electrical charges, and wherein the metric is computed in response to the at least partial collection.

4. The apparatus according to claim 1, wherein the first pulse shaper is coupled to receive the pulse, and wherein the metric comprises a first-shaper-peak-level of an output of the first pulse shaper generated in response to the pulse.

5. The apparatus according to claim 1, wherein the second pulse shaper is coupled to receive the pulse, and wherein the indication comprises a second-shaper-peak-level of an output of the second pulse shaper generated in response to the pulse.

6. The apparatus according to claim 5, wherein the comparator circuitry is configured to receive the second-shaper-peak-level and in response to output a Boolean value that the metric is representative of the energy of the photon.

7. The apparatus according to claim 1, and comprising a processor which is coupled to receive the metric of each of the detector circuits in response to the respective indication, and which is configured, in response, to compute an interaction-location of the photon within the detector.

8. The apparatus according to claim 7, wherein, for each of the detector circuits, the processor is configured to apply a weight to the metric according to a value of the metric, and to apply the weight in computing the interaction-location.

9. Apparatus for detecting radiation, comprising:
a detector which is configured to generate electrical charges responsive to incidence of a photon thereon;
a plurality of detector circuits coupled to the detector at different respective locations, each circuit comprising:
an amplifier which is configured to generate a pulse in response to the charges;
a first pulse shaper, having a first time constant, which is configured to produce a metric representative of an energy of the pulse;
a second pulse shaper, having a second time constant greater than the first time constant, which is configured to produce an indication that the metric is representative of an energy of the photon; and
a summing device which is coupled to sum the metric of each of the detector circuits in response to the respective indication,
wherein the second pulse shaper is coupled to receive the pulse, and wherein the indication comprises a second-shaper-peak-level of an output of the second pulse shaper generated in response to the pulse,
wherein each circuit comprises comparator circuitry which is configured to receive the second-shaper-peak-level and in response to output a Boolean value that the metric is representative of the energy of the photon,
wherein the comparator circuitry is configured to receive the metric, to form a ratio relating the second-shaper-peak-level and the metric, and to compare the ratio with a preset level so as to output the Boolean value.

10. The apparatus according to claim 9, wherein the metric comprises a first-shaper-peak-level of an output of the first pulse shaper generated in response to the pulse.

11. A method for detecting radiation, comprising:
generating in a detector electrical charges responsive to incidence of a photon thereon;
coupling a plurality of detector circuits to the detector at different respective locations, each circuit comprising:
an amplifier which is configured to generate a pulse in response to the charges;
a first pulse shaper, having a first time constant, which is configured to produce a metric representative of an energy of the pulse;
a second pulse shaper, having a second time constant greater than the first time constant, which is configured to produce an indication that the metric is representative of an energy of the photon; and
summing in a summing device the metric of each of the detector circuits in response to the respective indication,
and comprising coupling the second pulse shaper to receive the pulse, and wherein the indication comprises a second-shaper-peak-level of an output of the second pulse shaper generated in response to the pulse,
and comprising receiving the second-shaper-peak level in comparator circuitry and in response outputting a Boolean value that the metric is representative of the energy of the photon,
wherein the comparator circuitry is configured to receive the metric, to form a ratio relating the second-shaper-peak-level and the metric, and to compare the ratio with a preset level so as to output the Boolean value.

12. The method according to claim 11, wherein the metric comprises a first-shaper-peak-level of an output of the first pulse shaper generated in response to the pulse.

13. A method for detecting radiation, comprising:
generating in a detector electrical charges responsive to incidence of a photon thereon;
coupling a plurality of detector circuits to the detector at different respective locations, each circuit comprising:
an amplifier which is configured to generate a pulse in response to the charges;
a first pulse shaper, having a first time constant, which is configured to produce a metric representative of an energy of the pulse;
a second pulse shaper, having a second time constant greater than the first time constant, which is configured to produce an indication that the metric is representative of an energy of the photon; and
summing in a summing device the metric of each of the detector circuits in response to the respective indication,
wherein each detector circuit comprises comparator circuitry which is configured to generate a ratio relating the metric to the indication, and to generate a summing trigger in response to the ratio, the method further comprising receiving in a coincidence verifier circuit each summing trigger, the circuit in response providing a coincidence signal, representative of coincidence between each pulse, to the summing device, so as to cause the device to sum.

14. The method according to claim 13, and comprising coupling the first pulse shaper to receive the pulse, and wherein the metric comprises a first-shaper-peak-level of an output of the first pulse shaper generated in response to the pulse.

15. The method according to claim 13, and comprising coupling the second pulse shaper to receive the pulse, and wherein the indication comprises a second-shaper-peak-level of an output of the second pulse shaper generated in response to the pulse.

16. The method according to claim 15, and comprising receiving the second-shaper-peak-level in the comparator circuitry and in response outputting a Boolean value that the metric is representative of the energy of the photon.

17. The method according to claim 13, and comprising a coupling a processor to receive the metric of each of the detector circuits in response to the respective indication, and configuring the processor to compute, in response, an interaction-location of the photon within the detector.

18. The method according to claim 17, and comprising, for each of the detector circuits, applying a weight to the metric according to a value of the metric, and applying the weight in computing the interaction-location.

19. The method according to claim 13, and comprising locating anodes at the respective locations, wherein the anodes are coupled to the respective amplifiers, and wherein the anodes are arranged to perform at least partial collection of the electrical charges, the method comprising computing the metric in response to the at least partial collection.

* * * * *